United States Patent [19]

Vogt et al.

[11] Patent Number: 5,684,347

[45] Date of Patent: Nov. 4, 1997

[54] MOUNTING CLIP FOR A MOTOR PROTECTOR

[75] Inventors: Sheryl Lynn Vogt, Fort Wayne, Ind.; Charles Minh Nguyen, Smyrna, Tenn.

[73] Assignee: General Electric Company, Fort Wayne, Ind.

[21] Appl. No.: 475,518

[22] Filed: Jun. 7, 1995

[51] Int. Cl.⁶ .................................................. H02K 11/00
[52] U.S. Cl. ...................... 310/68 C; 310/68 R; 310/71; 338/28
[58] Field of Search .................................. 310/68 C, 71, 310/194, 68 R, 260, 180; 338/28

[56] References Cited

U.S. PATENT DOCUMENTS

| | | | |
|---|---|---|---|
| 2,909,719 | 10/1959 | Dubberley | 318/473 |
| 3,319,096 | 5/1967 | Eberhart et al. | 310/68 |
| 3,490,820 | 1/1970 | Lewis | 310/72 |
| 3,875,439 | 4/1975 | Roach | 310/68 |
| 4,028,570 | 6/1977 | Kieffer et al. | 310/68 |
| 4,061,935 | 12/1977 | Kandpal | 310/68 C |
| 4,181,393 | 1/1980 | Lill | 339/98 |
| 4,188,553 | 2/1980 | Wheaton | 310/68 C |
| 4,313,069 | 1/1982 | Szabo et al. | 310/68 C |
| 4,328,438 | 5/1982 | Zolman | 310/68 R |
| 4,503,347 | 3/1985 | Bergman | 310/68 |
| 4,734,602 | 3/1988 | Hauser et al. | 310/68 C |
| 4,847,527 | 7/1989 | Dohogne | 310/218 |
| 4,890,025 | 12/1989 | Hadeler et al. | 310/68 C |
| 4,894,571 | 1/1990 | Hildebrandt et al. | 310/68 C |
| 4,914,329 | 4/1990 | Ottersbach | 310/68 C |
| 4,924,350 | 5/1990 | Reddy et al. | 361/386 |
| 5,032,749 | 7/1991 | Stone | 310/68 C |
| 5,170,307 | 12/1992 | Nacewicz et al. | 361/24 |

OTHER PUBLICATIONS

Klixon Automatic Motor Protector (AM series), Texas Instrument Incorporated (no date).

Primary Examiner—Clayton E. LaBalle
Assistant Examiner—Timothy A. Williams
Attorney, Agent, or Firm—Ralph E. Krisher, Jr.

[57] ABSTRACT

A mounting clip for securing a motor protector to the stator of an electric motor is described. In one embodiment, the mounting clip includes a protector holding region formed by a base portion, a back portion, arm portions, and a retaining member. The protector is positioned within the protector holding region. The base of the mounting clip seats upon the uppermost, or outermost, lamination of the lamination stack forming the motor stator and includes one or more fingers sized for insertion between adjacent stator winding gaps. The mounting clip is maintained in position by the friction fit between the clip fingers, the stator windings and insulation.

19 Claims, 2 Drawing Sheets

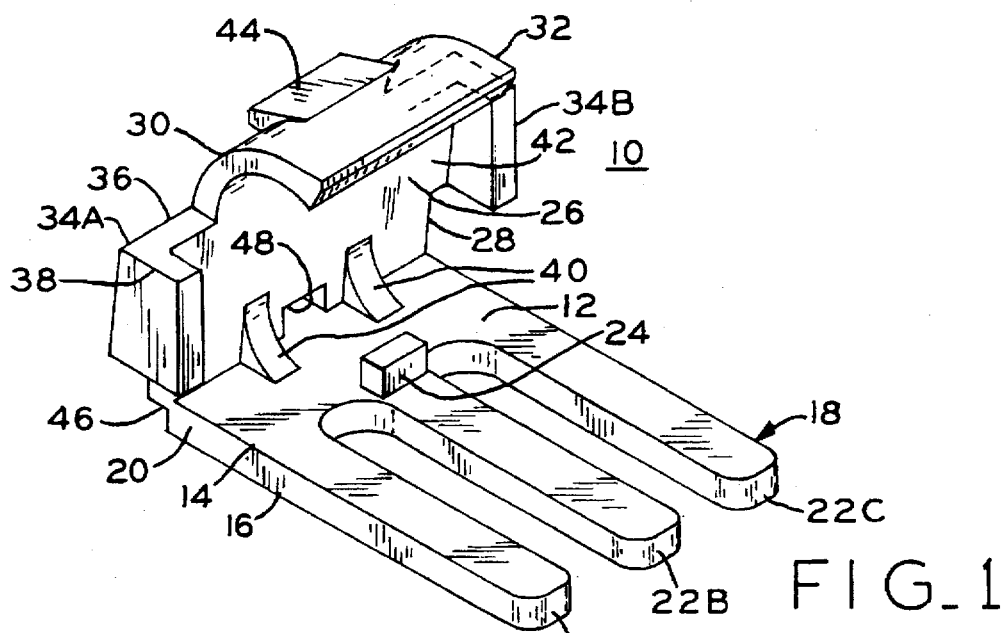
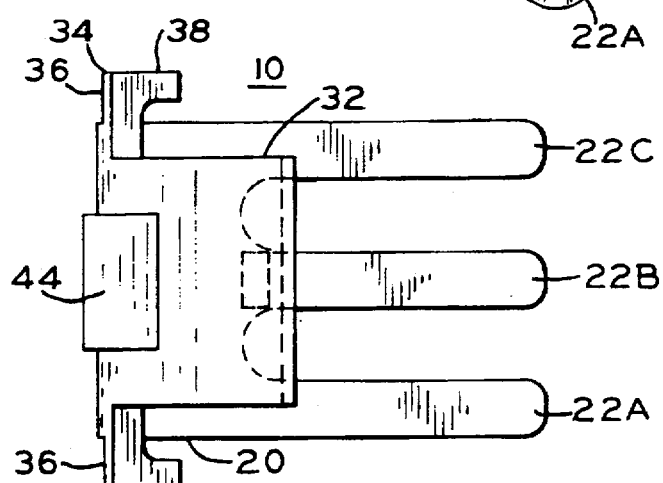
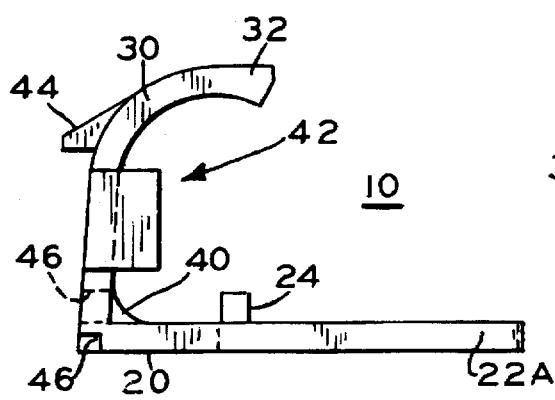 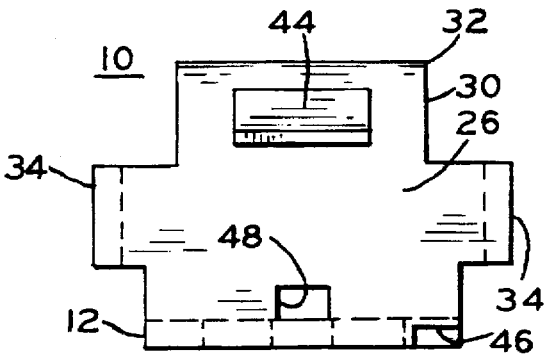

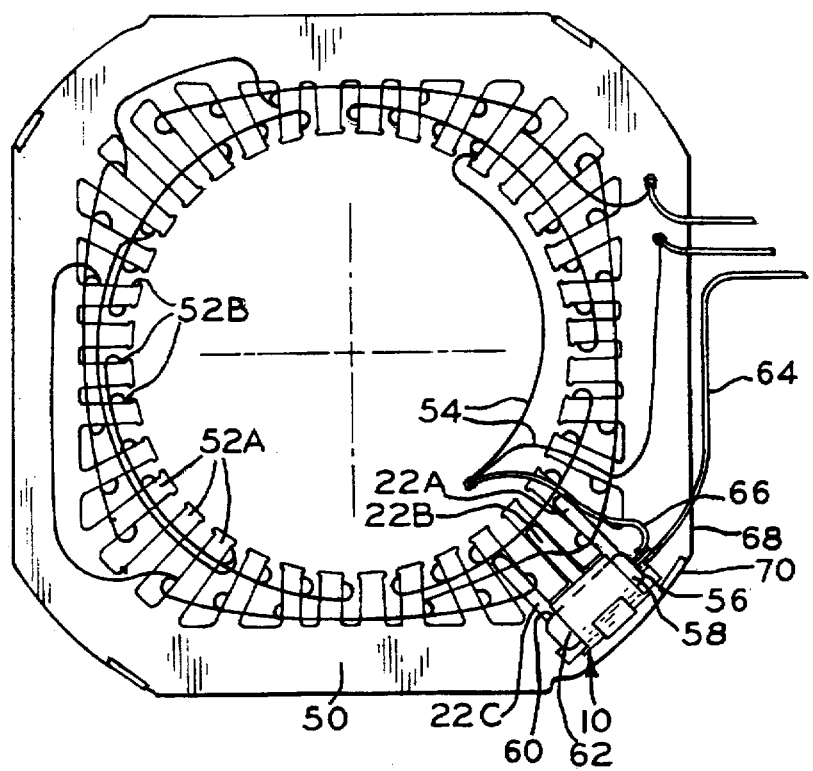
FIG_5
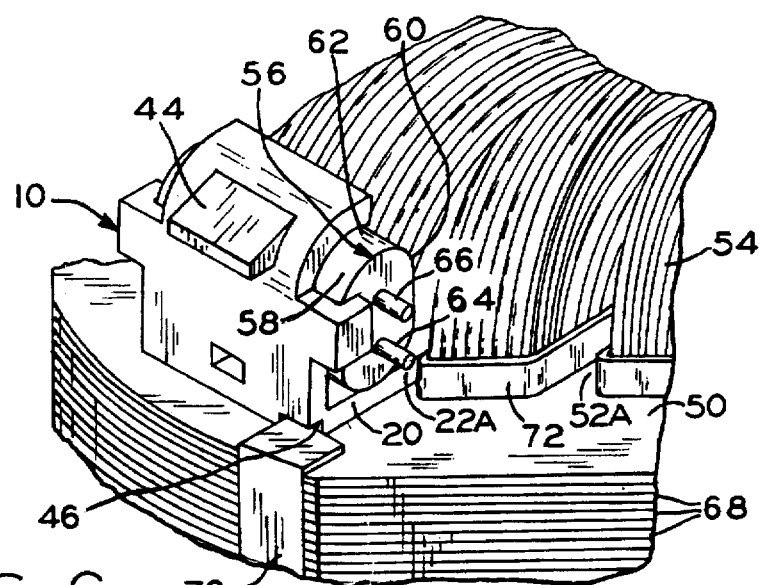
FIG_6 ions. If the\n# MOUNTING CLIP FOR A MOTOR PROTECTOR

FIELD OF THE INVENTION

This invention relates generally to mounting apparatus for motor protectors and more particularly, to a mounting clip for mounting a motor protector to the stator of an electric motor.

BACKGROUND OF THE INVENTION

Dynamoelectric machines such as an electric motor normally include a protector, sometimes referred to herein as an overload protector, to de-energize the motor stator windings in the event of an overload or overcurrent condition. Particularly, in normal operation, the temperature of the stator windings is within a first temperature range. Upon the occurrence of an overload condition, however, the temperature of the stator windings rises to a temperature above the first range. If the temperature of the windings becomes too high, the windings may be damaged.

With respect to other fault conditions, such as a locked rotor, high currents may flow through the stator windings. Under such high current conditions, the temperature of the windings may significantly increase. Therefore, under high current conditions, the stator windings may be damaged.

Known motor protectors include a switch having a movable and a stationary contact. A bimetal element, responsive to high temperatures and currents, controls movement of the movable contact. Typically, the movable contact is mounted on the bimetal element. A heater element also usually is connected in series circuit with the contacts, e.g., to the bimetal element. The contacts, bimetal element and heater element are disposed in a metallic housing.

The bimetal element moves from a first position to a second position when heated above a transition temperature, sometimes referred to as a calibrated "trip" temperature. When the bimetal element is sufficiently cooled, the bimetal element returns to the first position from the second position. The stationary and movable contact are in a circuit-making condition when the bimetal element is in the first position. When the bimetal element is in the second position, the stationary and movable contacts are in a circuit-breaking condition.

The protector typically is positioned adjacent the end turns of the stator windings and is electrically connected in series circuit between an energy source and the motor windings. For example, a first lead is connected at one end to the stationary contact side of the protector circuit and a second lead is connected at one end to the moveable contact side of the protector circuit. The other end of the first protector lead is connected to the energy source and the other end of the second protector lead is connected to the common connection of the start and run windings. The protector typically is physically placed in a position relative to the stator windings so that the bimetal element is heated to a temperature representative of the temperature of the stator windings.

Under normal operating conditions, the bimetal element is in the first position and the stationary and movable contact are in a circuit-making condition. Therefore, the stator windings are energized. Upon the occurrence of an overload condition, for example, the stator windings, the heater element and the bimetal element generate increased heat. If the temperature of the bimetal element rises above the calibrated "trip" temperature, the bimetal element moves to the second position thereby moving the movable contact out of engagement with the stationary contact into a circuit-breaking condition. In an overcurrent condition, current flow through the bimetal element causes the bimetal element itself to generate sufficient heat to cause the bimetal element to trip, or move to the second position. In both the overload and overcurrent conditions, when the bimetal element trips, the supply current to the stator windings is interrupted and the windings are de-energized.

In order to position an overload protector relative to a motor stator so that the protector responds to an overload condition, it is known to mount the protector to the stator in a variety of ways including by using tie chords or strings, mounts requiring bolts or screws, and clamps which require engagement with the motor housing. Although tie chords and strings are useful with respect to locating the protector in a desired position, such tie chords and strings require manual application. In a high volume manufacturing process, requiring workers to tie down each thermal overload protector is a time consuming and expensive operation. Similarly, the application of mounts requiring bolts and screws is time consuming and complex. Such bolts and screws also may adversely affect the magnetic properties of the motor.

With known clamps which engage the motor endshield to mount the protector in the desired position, when securing the motor endshield to the stator, it is possible to jar the clamp from the desired position. In addition, some clamps are configured to mate with the stator windings within very limited tolerances. Any variation in the winding dimensions could prevent proper mounting of such clamps. If the protector is not properly mounted, the protector may not operate to properly protect the stator windings.

Accordingly, it is desirable and advantageous to provide a motor protector mounting apparatus which is inexpensive to manufacture and which can be quickly and easily attached to the stator without requiring engagement with the motor endshields and without the use of tie chords, bolts, or screws. It also is desirable and advantageous to provide a motor protector mounting apparatus which positions the protector in close association with the stator windings and which is not adversely affected by slight variations in the winding dimensions.

An object of the present invention is to provide a motor protector mounting apparatus which effectively secures the protector in close association with the stator windings of an electric motor so that the protector is responsive to the stator winding temperature.

Another object of the present invention is to provide a motor protector mounting apparatus which does not affect the magnetic properties of the stator of an electric motor and which does not require limited tolerances for mounting to the motor stator.

Yet another object of the present invention is to provide a motor protector mounting apparatus which is inexpensive to manufacture and which can be quickly and easily mounted to an electric motor stator.

SUMMARY OF THE INVENTION

These and other objects of the invention are attained by an apparatus which, in one embodiment, is a mounting clip which includes a base having a front portion, a rear portion, an upper surface, and a lower surface. An overload protector retaining member extends from the upper surface of the base. The lower surface of the base is configured to be seated on an uppermost, or outermost, lamination of the lamination stack forming the motor stator.

The front portion of the base includes one or more fingers. Each finger is configured for being inserted into a winding gap formed by the stator windings. When inserted within a winding gap, each finger forms a friction fit with a portion of the stator windings and insulation. Such friction fit maintains the mounting clip in position relative to the stator windings.

Additional mounting clip retention is provided by a slot formed along the rear portion of the base. The slot is configured to cooperate with a stator lamination key and further facilitates maintaining the mounting clip in position without requiring engagement or contact between the motor endshield and the mounting clip and without the use of tie chords, bolts, or screws.

A back portion of the mounting clip extends upward from the rear portion of the base and includes a substantially vertical section, a curved section, and an overhang section. One or more ribs extending between the back portion and the base are provided for strengthening the connection between the back portion and the base. The overhang section of the back portion extends above the base and towards the front portion of the base. One or more L-shaped arms extend from the back portion. A protector holding region is formed by the base, the back portion, the L-shaped arms, and the retaining member. A positioning tab extends from the curved section of the back portion and is configured for a non-contacting relationship with the motor housing.

To assemble the mounting clip and the overload protector, the overload protector is inserted into an insulating sleeve. The sleeve and protector are then placed within the holding region of the clip. The overload protector initially is maintained in the holding region by the cooperation of the base, the back portion, the L-shaped arm portions, and the retaining member. The assembled mounting clip and overload protector are easily mounted to the stator by aligning each finger of the clip with a gap formed by the stator windings and then inserting each finger into a respective aligned gap. The clip fingers are inserted into the respective gaps so that a portion of the protector contacts a portion of the stator windings. When so assembled, the mounting clip fingers and the stator insulation and windings are in frictional engagement.

With the assembled mounting clip and protector secured to the stator, the motor endshields may then be secured to the motor stator. Leads from the protector and the stator windings extend through an opening in one of the motor endshields to an external control. If the motor endshield adjacent the clip is properly secured and if the mounting clip is properly mounted, the positioning tab of the mounting clip does not contact the motor endshield. However, if the motor endshield is not properly aligned or if the mounting clip is not properly mounted, the positioning tab prevents fully securing the motor endshield. In this manner, the positioning tab serves as a check on proper positioning of the motor endshield and the mounting clip.

The embodiment of the mounting clip as described above maintains a motor protector in thermal communication with at least a portion of the stator windings so that the protector is responsive to the stator winding temperature. The term "thermal communication" as used herein is not limited to mean that the protector, or a portion of the protector, must be in direct or indirect physical contact with at least a portion of the stator windings. Rather, as used herein, such term means that the protector is configured and positioned so that heat generated by the stator windings affects the temperature of the bimetal element. Of course, in addition to the heat generated by the stator windings, other elements such as heater elements may be used to generate heat and affect the state of the bimetal element.

The above described mounting clip is inexpensive to manufacture and facilitates quick and easy mounting of a protector on a motor stator without requiring the use of tie chords, bolts or screws. Moreover, the mounting clip does not affect the magnetic characteristics of the motor and does not require limited tolerances in order to form a friction fit with the stator windings and insulation.

BRIEF DESCRIPTION OF THE DRAWINGS

FIG. 1 is a perspective view of a motor protector mounting clip in accordance with one embodiment of the present invention.

FIG. 2 is a top view of the mounting clip shown in FIG. 1.

FIG. 3 is a side view of the mounting clip shown in FIG. 1.

FIG. 4 is a rear view of the mounting clip shown in FIG. 1.

FIG. 5 is a top view of the an assembled protector and mounting clip secured to a motor stator.

FIG. 6 is a perspective view of the protector and mounting clip secured to a motor stator as shown in FIG. 5.

DETAILED DESCRIPTION OF THE DRAWINGS

FIG. 1 is a perspective view of a mounting clip 10 which includes a base 12 having an upper surface 14, a lower surface 16, a front portion 18 and a rear portion 20. Front portion 18 includes a plurality of finger segments 22A-C. A retaining member 24 extends from base 12.

A back portion 26 extends from rear portion 20 of base 12. Back portion 26 has a substantially vertical section 28, a curved section 30 and an overhang section 32. L-shaped arm portions 34A-B extend from back portion 26. Each L-shaped arm portion 34A-B has a first segment 36 and a second segment 38. Rib portions 40 formed between base 12 and back portion 26 add strength to support back portion 26. A protector holding region 42 is formed by base 12, back portion 26, L-shaped arm portions 34, and retaining member 24.

A positioning tab 44 extends from curved section 30 and, as hereinafter described, assists in ensuring proper positioning of clip 10. A slot 46, formed in rear portion 20 of base 12, also assists in positioning clip 10 as hereinafter described.

FIG. 2 is a top view of mounting clip 10. As shown in FIG. 2, finger segments 22A–C extend in a substantially parallel relationship with respect to each other and are substantially the same length. With respect to L-shaped arm portions 34, first segments 36 extend beyond base 12 and second segments 38 extend substantially perpendicular to first segments 36 and towards front portion 18 of base 12. Positioning tab 44 extends beyond rear portion 20 of base 12.

FIG. 3 is a side view of mounting clip 10. Overhang section 32 extends over and beyond retaining member 24 towards front portion 18 of base 12. The extension of positioning tab 44 beyond rear portion 20 of base 12 is also illustrated.

FIG. 4 is a rear view of mounting clip 10. With respect to back portion 26, in the area extending from base 12 to arm portions 34, the width of back portion 26 is substantially the same width as base 12. The width of curved section 30 and overhang section 32 is less than the width of base 12. The specific relative dimensions of clip 10, including back portion 26, can be selected in order to accommodate the particular protector to be used.

Mounting clip 10 is manufactured from Valox® (Valox is a trademark of General Electric Company) plastic using an injection molding process. Valox plastic is a polybutylene terepthalate plastic. A rectangular opening 48 in back portion 26 is utilized in the injection molding process for formation of retaining tab 24. The injection molding process is an inexpensive manner for manufacturing mounting clip 10. Other materials and processes may, of course, be used to manufacture mounting clip 10.

FIG. 5 is a top view of mounting clip 10 secured to a motor stator 50. Stator 50 includes stator lamination teeth 52A which define winding slots 52B. Stator windings 54 are wound around selected teeth 52A and through selected slots 52B. Windings 54, as schematically illustrated in FIG. 5, include start and run windings. As is well known, in operation, the start winding may be utilized both for motor start-up and as an auxiliary main winding. Many other winding configurations are, of course possible. Mounting clip 10 is not limited to use with any one particular winding configuration.

As shown in FIG. 5, a protector 56 is inserted within holding region 42 of clip 10 and a portion of protector 56 contacts a portion of windings 54. Protector 56 includes a metallic housing 58. Such housing 58 includes a plate portion 60 and a can portion 62. Plate portion 60 is electrically isolated from can portion 62 but is attached to can portion 62. A switch (not shown) having a stationary contact and a movable contact is mounted within housing 58. A bimetal element and a heater element also are mounted within housing 58. The bimetal element, as hereinbefore described, controls movement of the movable contact.

More specifically, the heater element and one end of the bimetal element are welded to plate portion 60, such as by spot welding. The movable contact is mounted on the other end of the bimetal element and is aligned with the stationary contact. The stationary contact is attached to can portion 62 of housing 58. A first lead 64 is attached at one end to, and is in electrical circuit with, can portion 62. A second lead 66 is attached at one end to, and is in electrical circuit with, plate portion 60. The other end of second lead 66 is connected to the common connection of stator windings 54.

The bimetal element is calibrated to "trip", or move, from a first position to a second position, when the temperature of the bimetal element rises above the calibrated "trip" temperature. As hereinbefore described, the bimetal element first position corresponds to a circuit-making condition and the bimetal element second position corresponds to a circuit-breaking condition. The bimetal element normally is in the first position.

Protectors, such as protector 56, which may be used in combination with clip 10 are commercially available such as the Model #8AM Series available from Texas Instruments Canada Limited, 280 Centre Street East, Richmond Hill, Ontario, Canada, L4C 1B 1. The specific switching characteristics, including the calibrated "trip" temperature, of the bimetal element may be selected depending upon the particular application.

To assemble clip 10 and protector 56 to stator 50, metallic housing 58 is placed within a Mylar sleeve (not shown). Mylar is a trademark of Dupont for a polyethylene terephthalate film. As described above, metallic housing 58 is part of the electrical circuit of protector 56. The Mylar sleeve insulates housing 58 from stator windings 54 and transmits heat from stator windings 54 to metallic housing 58. Materials other then Mylar plastic could, of course, be used for the protector sleeve.

After housing 58 is inserted within the Mylar sleeve, housing 58 is placed within holding region 42 of clip 10. Assembled mounting clip 10 and protector 56 are then mounted to stator 50 by aligning clip finger segments 22A–C with selected stator teeth 52A. Stator windings 54 form gaps at the location of teeth 52A, and clip finger segments 22A–C are inserted into such gaps along teeth 52A. Mounting clip 10 is pushed towards stator windings 54 until at least a portion of the Mylar sleeve of protector 56 firmly contacts at least a portion of stator windings 54. As shown schematically in FIG. 5, protector 56 is in contact with a portion of the motor run winding.

FIG. 6 is a perspective view of mounting clip 10 secured to stator 50. Only a portion of stator 50 is shown in FIG. 6. Stator 50 includes a plurality of laminations 68 held together in a stack by stator key 70. Insulation wedges 72 are located in winding slots 52B and are disposed between stator windings 54 and laminations 68. Clip finger segments 22A–C are sized to form a friction fit with insulation wedges 72 and windings 54. Such friction fit maintains mounting clip 10 in the desired position. Specifically, fingers 22A–C make physical contact with wedges 72, and the forces generated by wedges 72, windings 54 and fingers 22A–C act to retain clip 10 in position. Also, slot 46 located along rear portion 20 of clip 10 cooperates with stator key 70 to further secure mounting clip 10 in position. Specifically, the cooperation of stator key 70 and slot 46 limits radial movement of clip 10.

Once mounting clip 10 and protector 56 are properly mounted to stator 50, the entire stator assembly may be varnished. The varnish application further aids in maintaining mounting clip 10 in the desired position. Of course, it is contemplated that the varnish step could be eliminated.

Motor endshields (not shown) are assembled to stator 50 after the assembled clip 10 and protector 56 are secured to stator 50 as described above. The motor endshield adjacent clip 10 cooperates with positioning tab 44 of clip 10 so that if the endshield is not properly aligned or if mounting clip 10 is not properly mounted, positioning tab 44 prevents the motor endshield from being fully secured. When both the motor endshield and clip 10 are properly mounted, mounting clip 10 does not contact the motor endshield. Positioning tab 44, therefore, is a check on proper positioning of the motor endshield and mounting clip 10. First lead 64, which is connected at one end to protector 56, extends through an opening in the motor endshield.

Prior to operation, first lead 64 is connected, at the end which extends through the motor endshield, to an energy source. The electrical circuit from the energy source to stator windings 54 is through protector 56. Particularly, current flows from the energy source through first lead 64 and can portion 62 to the stationary contact of protector 56. If the bimetal element is in the first position, i.e., circuit making position, current then flows from the stationary contact to the movable contact and through the bimetal element and the heater element to plate portion 60. Since second lead 66 is electrically connected to plate portion 60, current flows from plate portion 60 through second lead 66 to stator windings 54. In this manner, stator windings 54 are energized.

Under normal conditions, the bimetal element of protector 56 is in the first position. Therefore, the movable and stationary contacts of protector 56 are in the circuit-making condition. Heat generated by stator windings 54 is transferred through the protector sleeve and protector housing 58 to the bimetal element. Heat generated by the heater element and by the bimetal element itself also heats the bimetal element. Under normal conditions, however, the heat generated by stator windings 54, the heater element and the bimetal element is not sufficient to heat the bimetal element above its calibrated "trip" temperature. Therefore, in normal operating conditions, the stationary and movable contacts remain in the circuit-making condition.

If the temperature of stator windings 54 exceeds the normal operating temperature range, however, the bimetal element is heated to or above the calibrated "trip" temperature thereby moving the movable contact out of contact with the stationary contact, i.e., the circuit-breaking position. In addition, if windings 54 draw a pre-selected excess current, the bimetal element itself generates sufficient heat so that the temperature of the bimetal element rises to or above the calibrated "trip" temperature. As explained above, when the bimetal element is heated to or above the calibrated "trip" temperature, the bimetal element moves to the second position, i.e., the circuit breaking condition, and stator windings 54 are de-energized.

For both the overload and overcurrent conditions, when windings 54, the heater element and the bimetal element sufficiently cool, the bimetal element transitions back to the first position and windings 54 are energized. If the condition which caused the bimetal element to "trip" has been corrected, normal motor operation resumes. Otherwise, the bimetal element will again be heated to the calibrated "trip" temperature and windings 54 will be de-energized.

As explained above, mounting clip 10 is inexpensive to manufacture and is quickly and easily installed on a motor stator. Further, mounting clip 10 provides an effective mounting apparatus for securing protector 56 in thermal communication with a portion of stator windings 54. Such mounting of protector 56 facilitates ensuring a timely response to a high temperature condition of stator windings 54 which, of course, is important in protecting windings 54 from an overload condition. In addition, clip 10 does not require the use of chords, bolts or screws and clip 10 does not adversely affect the magnetic properties of the motor.

Of course, other types of thermal overload protectors other than a bimetal type protector could be utilized with clip 10, such as a positive temperature coefficient resistor (PTCR). As in well known, the resistance of the PTCR rises in relation to increasing temperature. At a pre-determined temperature, the PTCR resistance becomes so great that the current flow through the PTCR is substantially restricted or throttled so that the PTCR is disassociated from the circuit, i.e., an "open" circuit. Also, although thermal communication between the stator windings and protector generally is desirable, such thermal communication is not always necessary in every application, and mounting clip 10 can be used in such other applications.

The specific electrical connections between a protector and motor are dependent upon, for example, the protector and motor types. The description of the electrical connections and operation of the protector and motor set forth above, therefore, are by way of example only.

From the preceding description, it is evident that the objects of the invention are attained. Although the invention has been described and illustrated in detail, it is to be clearly understood that the same is intended by way of illustration and example only and is not to be taken by way of limitation.

For example, variation of the number of finger segments 22A–C is contemplated. Further, the size and shape of holding region 42 could be altered to accommodate the size and shape of a particular protector 56. Accordingly, the spirit and scope of the invention are to be limited only by the terms of the appended claims.

What is claimed is:

1. A mounting clip for securing a motor protector to a stator of an electric motor, the stator forming a rotor bore and having a plurality of stator teeth extending radially inward towards the bore, adjacent stator teeth defining slot, at least one stator winding being inserted within selected slots and forming winding gaps at an outer surface of the stator teeth, said mounting clip comprising:

a base having a front portion and a rear portion, said front portion comprising at least one finger segment configured for being positioned in a selected winding gap over one of said stator teeth; and a back portion extending from said rear portion of said base, a protector holding region formed by said base and said back portion.

2. A mounting clip in accordance with claim 1 wherein said finger segment is sized to form a frictional engagement with the stator winding when positioned in the selected winding gap.

3. A mounting clip in accordance with claim 1 wherein insulation material is between the stator winding and the stator teeth and wherein said finger segment is sized to form a frictional engagement with the insulation material and to physically contact a portion of the insulation material.

4. A mounting clip in accordance with claim 1 wherein said mounting clip further comprises a retaining member to aid in maintaining the motor protector in the protector holding region.

5. A mounting clip in accordance with claim 1 wherein the stator is formed from a plurality of laminations and at least one stator key assists in maintaining the laminations in a stacked relationship, and said mounting clip further comprises a slot formed along said rear portion of said base, said slot configured for cooperation with the stator key to limit movement of said mounting clip relative to the stator.

6. A mounting clip in accordance with claim 1 wherein said back portion comprises an overhang section, said overhang section extending over said base and toward said front portion of said base.

7. A mounting clip in accordance with claim 6 wherein said back portion further comprises a substantially vertical section and a curved section.

8. A mounting clip in accordance with claim 7 wherein said mounting clip further comprises a plurality of arms extending from said substantially vertical section of said back portion.

9. A mounting clip in accordance with claim 8 wherein each of said arms comprises a substantially L-shaped member.

10. A mounting clip in accordance with claim 1 wherein said mounting clip further comprises a positioning tab extending from said back portion.

11. A dynamoelectric machine comprising a stator which forms a rotor bore and has a plurality of stator teeth extending radially inward towards said rotor bore, adjacent stator teeth defining slots, at least one winding being inserted within selected slots and forming winding gaps at an outer surface of said stator teeth, a motor protector, a mounting clip for securing said motor protector to said stator, said mounting clip including at least one finger segment extending into one of said winding gaps over one of said stator teeth.

12. A dynamoelectric machine in accordance with claim 11 wherein insulation material is between said winding and said stator teeth, and said finger segment forms a frictional engagement with said insulation material and physically contacts a portion of said insulation material.

13. A dynamoelectric machine in accordance with claim 11 wherein said stator is formed from a plurality of laminations and at least one stator key assists in maintaining said laminations in a stacked relationship, and said mounting clip further includes a slot formed therein, said slot cooperating with said stator key for assisting in maintaining said mounting clip in position on said stator.

14. A dynamoelectric machine in accordance with claim 11 wherein said motor protector comprises a thermal overload protector and at least a portion of said protector is in thermal communication with at least a portion of said stator windings.

15. A dynamoelectric machine in accordance with claim 11 wherein said mounting clip further comprises a base and a back portion.

16. A dynamoelectric machine in accordance with claim 15 wherein a protector holding region is formed by said base and said back portion.

17. A dynamoelectric machine in accordance with claim 15 further comprising a motor endshield and wherein said mounting clip further comprises a positioning tab extending from said back portion for cooperating with said motor endshield, said motor endshield configured to be fully secured to said stator only when said motor endshield does not contact said positioning tab.

18. A method of securing a motor protector and a mounting clip to a stator of an electric motor, the stator forming a rotor bore and having a plurality of stator teeth extending radially inward towards the rotor bore adjacent stator teeth defining slots, at least one stator winding being inserted within selected slots and forming winding gaps at an outer surface of the stator teeth, the mounting clip comprising a protector holding region and at least one finger segment, said method comprising the steps of:

coupling the motor protector in series circuit with the stator winding;

placing the motor protector in the holding region of the mounting clip; and securing the mounting clip to the stator by inserting the finger segment of the mounting clip into a winding gap over one of said stator teeth wherein at least a portion of the motor protector is in thermal communication with at least a portion of the stator winding.

19. A method in accordance with claim 18 further comprising the step of varnishing the stator assembly after the mounting clip has been secured to the stator.

* * * * *